United States Patent [19]
Arakawa et al.

[11] Patent Number: 4,858,562
[45] Date of Patent: Aug. 22, 1989

[54] REHEAT TYPE WASTE HEAT RECOVERY BOILER AND POWER GENERATION PLANT

[75] Inventors: Tadao Arakawa; Tsuguo Hashimoto; Akihiro Kawauchi, all of Hitachi, Japan

[73] Assignee: Hitachi, Ltd., Tokyo, Japan

[21] Appl. No.: 189,406

[22] Filed: Apr. 26, 1988

[30] Foreign Application Priority Data

May 6, 1987 [JP] Japan .............................. 62-109040

[51] Int. Cl.$^4$ .............................................. F22D 1/00
[52] U.S. Cl. .................................. 122/7 R; 122/1 R; 122/406 S; 122/470
[58] Field of Search ................. 122/1 R, 7 R, 406 S, 122/470

[56] References Cited

U.S. PATENT DOCUMENTS

| | | | |
|---|---|---|---|
| 3,163,991 | 1/1965 | Capitaine | 122/1 R X |
| 3,769,795 | 11/1973 | Rostrom | 122/1 R X |
| 4,501,233 | 2/1985 | Kusaka | 122/406 S |
| 4,693,213 | 9/1987 | Yanai et al. | 122/7 R |

OTHER PUBLICATIONS

Patent Abstracts of Japan, vol. 8, No. 43(M-279)(1480); 2-84.
Patent Abstracts of Japan, vol. 8, No. 5(M-267)(1442) 1-84.

*Primary Examiner*—Edward G. Favors
*Attorney, Agent, or Firm*—Antonelli, Terry & Wands

[57] ABSTRACT

A power generation plant comprising a gas turbine and a waste heat recovery boiler in which feed water is heat-exchanged with exhaust gas from the gas turbine to produce vapor. A steam turbine system incorporates a reheat turbine and a high pressure turbine to which the vapor is supplied from the waste heat recovery boiler, with a generator being driven by the steam turbine system and condenser for condensing vapor from the stream turbine system into condensate and for supplying the condensate to the waste heat recovery boiler as the feed water. The waste heat recovery boiler is provided with a secondary reheater, a super heater, a primary reheater reheating vapor to be supplied to the secondary reheater and an evaporator for evaporating the feed water from the condenser into vapor and for supplying the vapor to the super heater, in order with respect to the exhaust gas flow. The vapor produced in the super heater is introduced into the high pressure turbine and the vapor produced in the secondary reheater is introduced into the reheat turbine.

14 Claims, 5 Drawing Sheets

REHEAT TYPE WASTE HEAT RECOVERY BOILER AND POWER GENERATION PLANT

FIELD OF THE INVENTION AND THE RELATED ART STATEMENT

The present invention relates to a combined power generation plant combining a gas turbine means, waste heat recovery boiler means, a steam turbine system and a generator means, and, more particularly, to a reheat type combined power generation plant in which a reheat cycle is applied to the steam turbine system.

As compared with the common thermal power generation plant, the combined power generation plant incorporating the gas turbine means therewith is capable of conducting load changes and starting-up/stopping rapidly and effectively. In order to operate such combined power generating plant more effectively, it is performed to apply the reheat cycle thereto. Namely, not only the evaporator and the super heater, but also the reheater is incorporated with the waste heat recovery boiler which recovers thermal energy from the exhaust gas from the gas turbine means and generates vapor. The vapor generated in the evaporator is superheated in the super heater into superheated vapor which is to be introduced into the high pressure turbine. The superheater vapor does the work on the high pressure turbine and thereafter is exhausted therefrom. The exhaust vapor from the high pressure turbine is reheated by the reheater in the recovery boiler means to high temperature vapor which is to be introduced into the medium or the low pressure turbine. The reheat cycle is effective in improving the efficiency in the combined power generation plant in which combustion temperature in the gas turbine means is high. The reheat type combined power generation plant can obtain a higher efficiency than that of the conventional combined power generation plant, for example, one incorporating multi-pressure turbine system.

A prior art waste heat recovery boiler incorporated in the reheat type combined power generation plant is disclosed in, for example, JP-A-61289201. In such recovery boiler, the exhaust gas from the gas turbine means is once separated into two flows. In one flow, a secondary super heater and a primary reheater are disposed in order with respect to such flow. On the contrary, in the other flow, a secondary reheater and a primary super heater are disposed in order with respect to such flow. Evaporator means are disposed in a combined exhaust gas flow which is integrated by the separated exhaust gas flows. The vapor generated in the evaporator means flows through the secondary super heater, the primary super heater, high pressure turbine means, the secondary reheater, the primary reheater and the medium/low pressure turbine means.

Such prior art waste heat recovery boiler causes the following disadvantages.

At first, since any consideration is not paid to the change of the temperature of exhaust gas which has been heat exchanged in the super heaters and the reheaters, there is a difference between the exhaust gas temperatures in the respective separated exhaust gas flows. Accordingly, the amounts of vapor generated in the respective evaporators differ from each other, which are disposed down stream side of the super heaters and of the reheaters. In order to make the temperature of the exhaust gas which has flowed through one of the separated exhaust gas flows identical to that through the other one, it is required to change the thermal load distribution on the respective super heaters and the reheaters in accordance with the difference between such temperatures. However, it is impossible in fact to change such distribution in proper within all over load range.

Secondary, in the combined plant in which heat is recovered from the exhaust gas from the gas turbine means, and in which vapor is generated by such recovered heat, as different from the thermal plant (e.g., steam plant), it is difficult to maintain the temperature and the pressure of the vapor in high level. Further, the vapor has a tendency to readily become wet vapor after conducting the work on the steam turbine. In particularly, the reheat type turbine has the thermodynamic disadvantages and the problems of erosion generated in the final stage of the steam turbine due to the wetness therein. Further, in a partial load operation of the gas turbine, the temperature of the exhaust gas decreases. Such decrease exerts adverse influences on the above disadvantages.

OBJECT AND SUMMARY OF THE INVENTION

An object of the present invention is to provide a reheat type combined power generation plant incorporating a heat recovery boiler capable of supplying primary vapor and reheated vapor to the corresponding steam turbines, respectively.

To this end, in the present invention, in order to produce vapor by means of using the exhaust gas from the gas turbine means and to suply such vapour into steam turbine system incorporating therein high pressure turbine means and reheat turbine means, disposed in the exhaust gas flow are a secondary reheater, a super heater and a primary reheater for reheating vapor to be supplied to the secondary reheater, in order with respect to the exhaust gas flow. The vapor generated in the super heater is supplied to the high pressure turbine means and the vapor generated in the secondary reheater is supplied to the reheat turbine means.

According to the present invention, the reheat cycle is applicable to the combined power generation plant combining the gas turbine means and the steam turbine system, whereby improving the thermal efficiency over wide range of load of the gas turbine means.

DETAILED DESCRIPTION OF THE PREFERRED EMBODIMENTS

Figure 1:
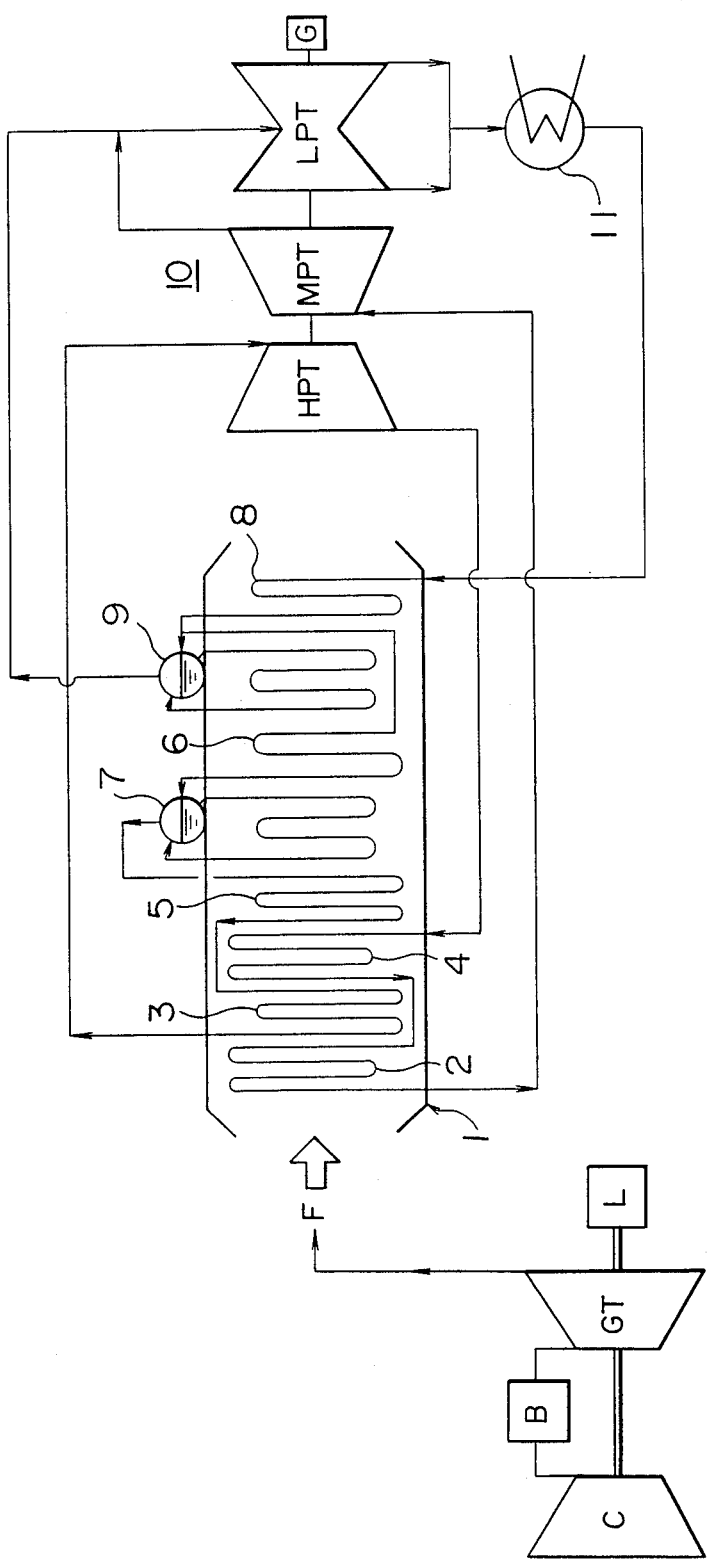
FIG. 1 is a schematic view of one embodiment of the present invention.

Referring now to the drawing wherein like reference numerals are used throughout the various views to designate like parts and, more particularly, to FIG. 1, according to this figure, a power generation plant according to one embodiment of the present invention includes a waste heat recovery boiler generally designated by the reference numeral 1 with a gas turbine system including a compressor C, a gas turbine GT and a combustor B. The waste heat recovery boiler 1 exchanges heat in exhaust gas F from the gas turbine GT with feed water flowing through the waste heat recovery boiler 1. The boiler 1 includes a secondary reheater 2, a secondary super heater 3, a primary reheater 4, and a primary super heater 5, which are disposed in order with respect to a flow direction of the exhaust gas. F. The boiler 1 further includes an economizer 6 and vapor generator means (evaporator) 7 disposed between the economizer 6 and the primary super heater 5. During load operation of the gas turbine GT, the vapor generated in the evaporator 7 flows into a hih pressure turbine (HPT) of a steam turbine system 10 through the primary super heater 5 and the secondary super heater 3. Such vapor does the work on the high pressure turbine (HPT) and then is introduced into a medium pressure turbine (MPT) of the steam turbine system 10 through the primary reheater 4 and the secondary reheater 2. After the vapor does the work on the medium pressure turbine (MPT), the vapor is introduced into a low pressure turbine (LPT) and does the work thereon. Thereafter, the vapor is condensed into condensate in a condenser 11. Since the boiler 1 is plural-stage recovery boiler, the boiler 1 further includes a lower pressure side economizer 8 and a lower pressure side evaporator 9. A part of feed water flowing through the lower pressure side economizer 8 is evaporated into vapor of lower pressure in the lower pressure side evaporator 9 and is introduced into the low pressure turbine (LPT). The lower pressure vapor together with the vapor from the medium pressure turbine (MPT) does the work on the low pressure turbine (LPT). The rest of feed water bypasses the lower pressure side evaporator 9 and is returned back to the higher pressure side evaporator 7 through the economizer 6. In generally, an exhaust vapor temperature from the high pressure turbine (HPT) is about 300° C. The exhaust vapor from the high pressure turbine (HPT) is reheated by the reheaters 2 and 4, so that a wetness fraction of the vapor in a final stage of the low pressure turbine (LPT) can be reduced.

Figure 2:
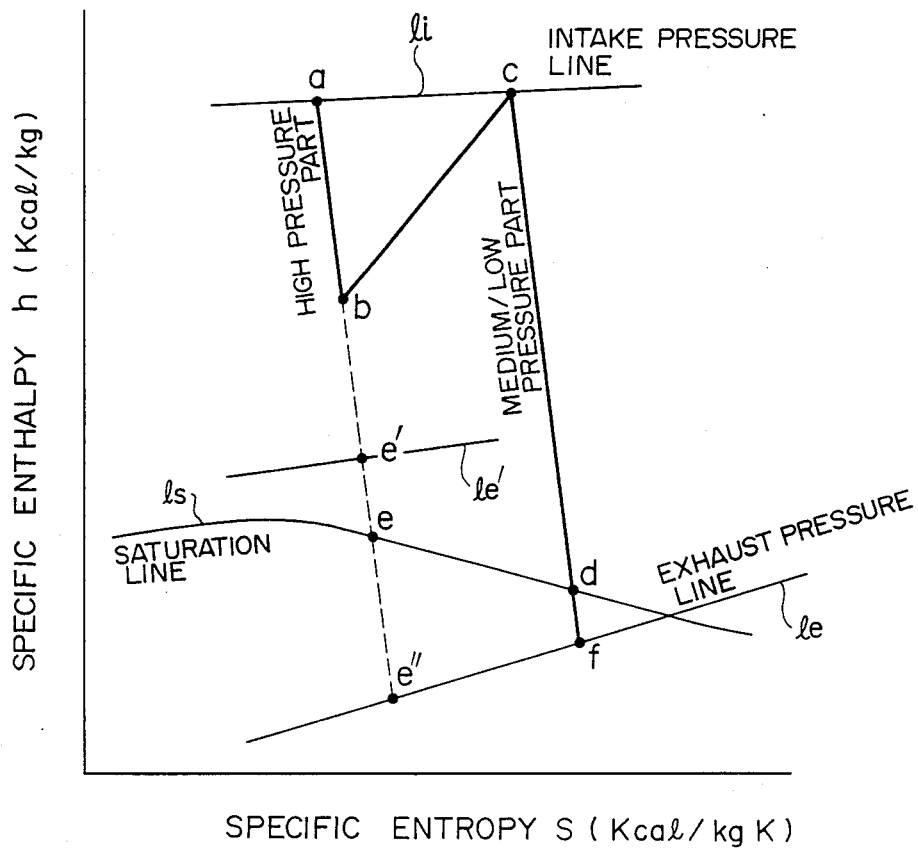
FIG. 2 is a graphical illustration of the characteristics between the specific enthalpy and the specific entropy.

Referring to FIG. 2, the work done on the steam turbine system 10 will be described more fully here and below.

A line 1s is a saturation line. Under the line 1s, the lower region the vapor resides, the higher the wetness fraction thereof becomes. To the contrary, the higher region the vapor resides, the higher the dryness fraction thereof becomes, i.e. the vapor becomes a superheated vapor. A line 1i is an intake pressure line which is determined by the pressure of vapor introduced into the steam turbine system 10. The values of specific enthalpy h and of specific entropy s of the vapor introduced into the high pressure turbine (HPT) from the secondary super heater 3 shown in FIG. 1 are represented by the point a in FIG. 2. A line 1e is an exhaust pressure line which is determined by the pressure of vapor introduced into the condenser 11 from the low pressure turbine (LPT). The point e" represents values of specific enthalpy h and of specific entropy s of the vapor without employing a reheat cycle. The point f represents values of specific enthalpy h and of specific entropy s of the vapor with employing the reheat cycle.

In FIG. 2, the segment abe represents change of vapor condition in the steam turbine without reheating the vapor. Accordingly, as the work done on the steam turbine increases, the vapor condition becomes under the point e, so that the vapor includes the wet vapor. If the steam turbine exhausts the vapor at the point e' on a characteristic line 1e' which does not reside in the wet vapor region, it is impossible to recover heat from the exhaust vapor sufficiently. On the contrary, if the steam turbine exhausts the vapor at the point e" on the exhaust pressure line 1e in the wet vapor region, it become possible to sufficiently recover heat from the exhaust vapor. However, the steam turbine may be damaged by wet vapor.

The segment abcdf represents change of vapor condition in the steam turbine with reheating the vapor. The vapor at the point a does the work on the high pressure turbine (HPT) and declines to the point b. Thereafter, the vapor is reheated to rise to the point c. Accordingly, such reheated vapor can do the work cdf on the medium (MPT) and the low pressure turbine (LPT). Even though, under the saturation line 1s, i.e. between the point d and the point f, the vapor includes wet vapor, the metal material selection in the final stage in the turbine makes it somewhat resistant against such wet vapor. Since the vapor is reheated and can be maintained in a higher temperature level, the wetness fraction in the final stage of the steam turbine can be reduced. Namely it can be possible to reduce the wetness fraction from a degree e—e" to a degree d-f.

In a power generation plant combining a steam turbine system and a gas turbine means, the temperature in exhaust gas from the gas turbine means is low on a lower load operation of the gas turbine means. In the plant shown in FIG. 1, since the reheater is disposed in an upper most stream side of the exhaust gas, the vapor can be reheated to a high temperature close approximate to the exhaust gas temperature. Accordingly, optimum vapor can be obtained, which is optimized with respect to wetness fraction in the final stage of the steam turbine. In this regard, the reheat cycle is effective. However, since the flow rate of the primary vapor is substantially identical to that of the reheated vapor, if the reheater is simply disposed upstream side of the super heater, the temperature of vapor in such super heater is lowered.

Figure 3:
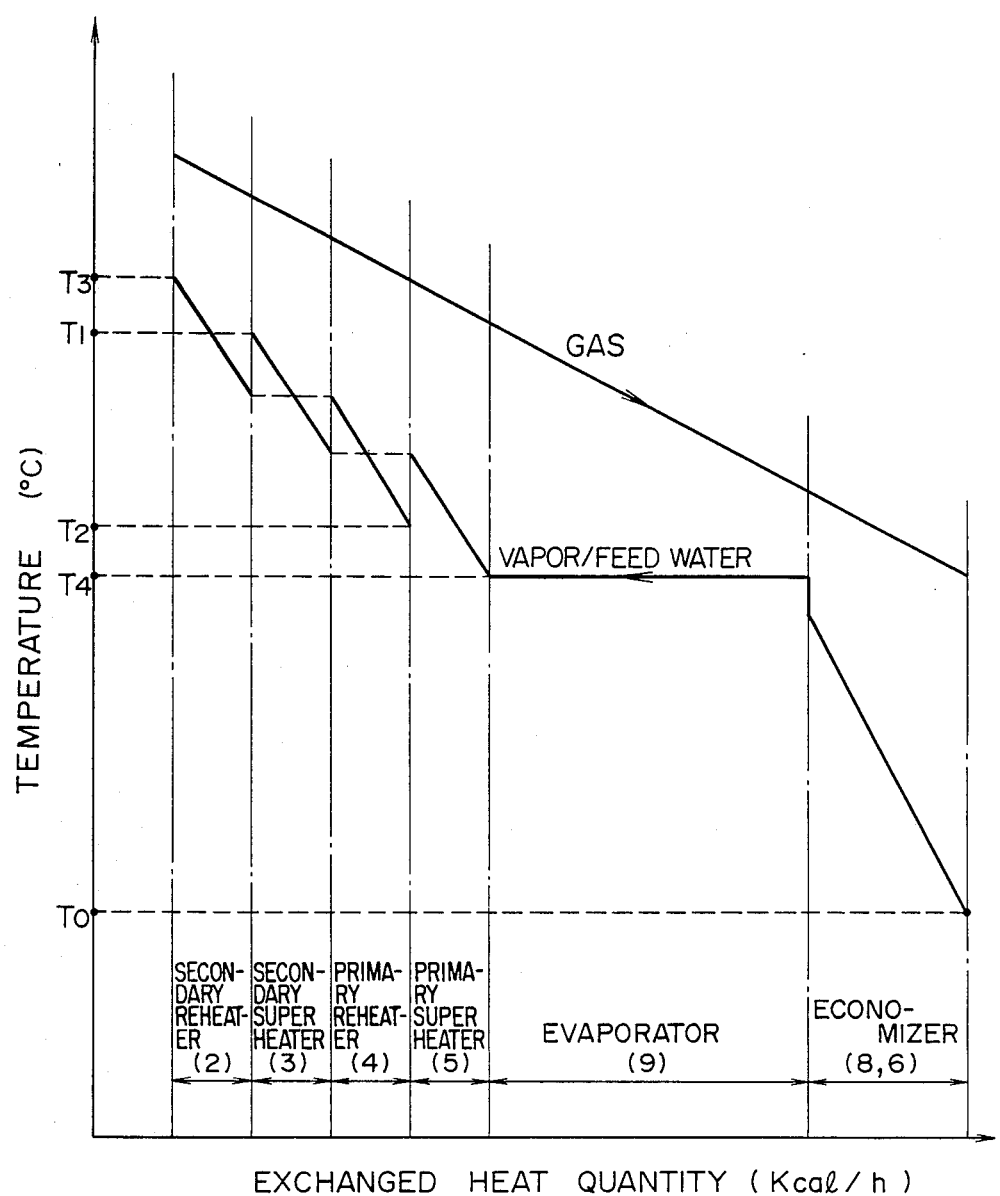
FIG. 3 is a graphical illustration of the characteristics of heat exchange between the exhaust gas and the vapor/feed water.

To avoid this, according to the present invention, the separate reheaters are so disposed as to interpose the super heater therebetween in order to balance the heat absorption. Accordingly, the heat exchange characteristics shown in FIG. 3 can be obtained, so that outlet temperatures of vapor in the super heater and the reheater are balanced. FIG. 3 shows the relationship between the vapor/feed water temperature in the respective apparatus in the heat recovery boiler 1 and the exhaust gas temperature therein. As shown in FIG. 3, the exhaust gas from the gas turbine means exchanges heat with the apparatus in the heat recovery boiler 1 and then the temperature of the exhaust gas is lowered. On the contrary, the vapor/feed water is heated in the economizers 8, 6, the evaporator 7, the primary super heater 5 and the secondary super heater 3, in order. Namely, the feed water of temperature To is heated and then changed into the vapor of temperature T1. The vapor of temperature T1 from the secondary super heater 3 does the work on the high pressure turbine (HPT) and then is changed into the vapor of temperature T2. The vapor of temperature T2 is introduced into the primary reheater 4 and is reheated in the primary reheater 4 and the secondary reheater 2 to be changed into the reheated vapor of temperature T3. Accordingly, it is possible to obtain the reheated vapor of the highest temperature and it is also possible to maintain the primary vapor in a high temperature level by means of selecting heat capacities of the super heaters and the reheaters proper. The vapor generated in the lower pressure side evaporator 9 has a temperature corresponding to the saturation temperature T4 in FIG. 3.

To the contrary, in the prior art, since the super heater and the reheater are parallel to flow of exhaust gas from the gas turbine so as to balance the temperatures in the super heater and the reheater, the energy in the exhaust gas is substantially separated into two halves. If the heat-transfer area is changed, the exhaust gas energy is separated into two parts which are not identical to each other. However, when the temperatures in the super heater and the reheater are balanced, the exhaust gas energy is separated into two parts which are approximately equal to each other. Further, in the prior art, the flow rate of the vapor flowing through the super heater is substantially identical to that through the reheater. Accordingly, when the temperature of the exhaust gas from the gas turbine is lowered, or the gas turbine operates in a low load level, the reheater can only use no more than a half of exhaust gas flow rate due to countermeasure for wet vapor in the final stage of the steam turbine. Accordingly, in the prior art, in order to obtain a heat balance between the super heater and the reheater the same as that of the present invention, it is required to prepare the super heater and the reheater, each of which has a cross section with respect to the exhaust gas flow direction twice that of the present invention. Further, in order to restrict the exhaust gas speed in the heat transfer surface of each of the super heater and the reheater within a predetermined range, i.e. in generally from 20 m/s to 30 m/s, the exhaust gas receiving part (the super heater and the reheater) of the waste heat recovery boiler must be considerably enlarged, so that disadvantages with respect to the arrangement and the cost are increased. The present invention can solve such disadvantages.

Figure 4:
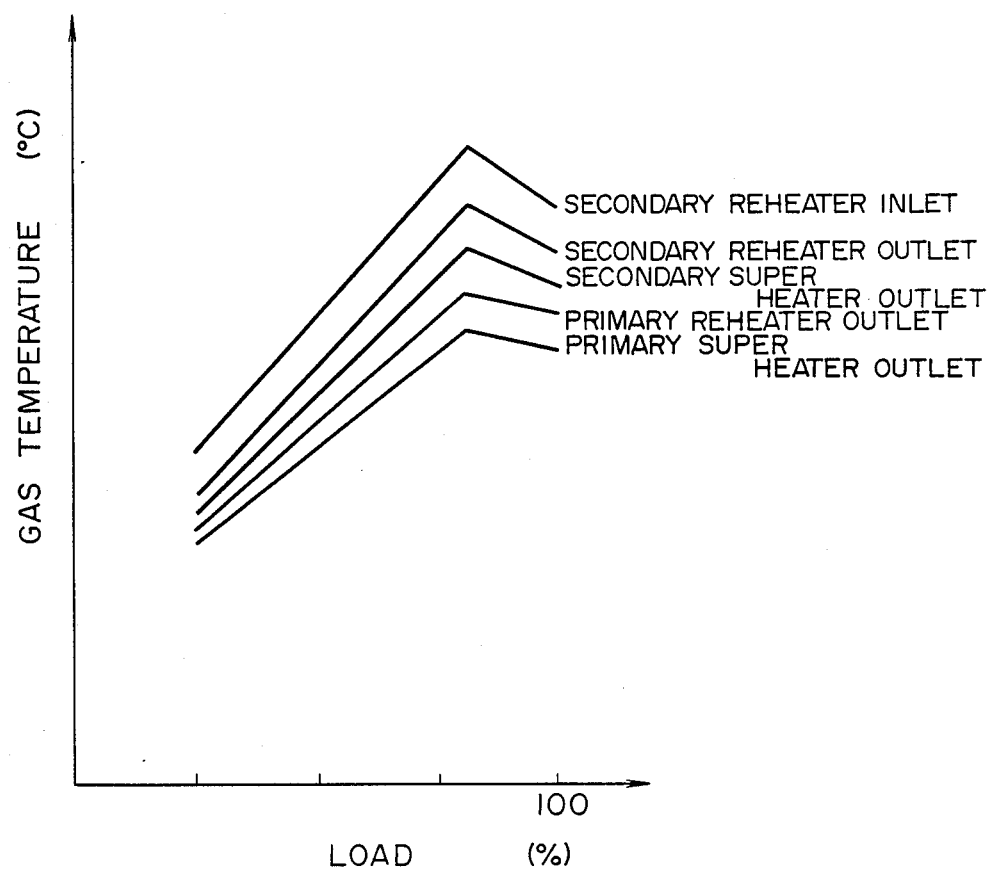
FIG. 4 is a graphical illustration of the characteristics of exhaust gas temperature in the respective positions in the heat recovery boiler shown in FIG. 1 with respect to load of the gas turbine means.

FIG. 4 shows the temperature characteristics of the exhaust gas in the respective parts of the waste heat recovery boiler with respect to the load of the gas turbine.

The temperature of the exhaust gas from the gas turbine means decreases in accordance with the load decrease. The reheater is disposed in an upper-most stream side with respect to the exhaust gas flow direction. The reheated vapor can be readily maintained in a maximum temperature level close to the exhaust gas temperature, and is most effective with respect to the wet vapor in the final stage in the steam turbine. Further, the temperature characteristics in the super heater and the evaporator which are disposed in a down stream side are also improved the same as the reheater, so that the temperature distribution is well balanced.

As apparent from the above-mentioned explanation, since the reheater is disposed in the upper-most stream side, the reheated vapor having a maximum temperature can be obtained even though the temperature of the exhaust gas from the gas turbine is lowered, or the gas turbine operates in a low load level, so that it is possible to avoid the erosion in the final stage of the steam turbine due to wet vapor.

Further, referring back to FIG. 4, the following explanation will be made to the vapor in the outlet of the high pressure turbine (HPT) in the plant in which the super heater is interposed between the separate heaters.

Generally, it is required to maintain the super heat degree of the vapor in the outlet of the high pressure turbine in a predetermined level. e.g. 50° F, in order to prevent the erosion due to the wet vapor from generating in the final stage of the turbine, and so on. Further, when the temperature of the exhaust gas from the gas turbine is low or the gas turbine operates in a low load, the temperature distribution in a down stream side of the exhaust gas flow is flat and the temperature difference is smaller than that on the high load operation. The degree of temperature decrease in the down stream side becomes small. Namely, due to decrease in the exhaust gas temperature, the heat exchange in the secondary reheater is not fully performed, and then the amount of vapor generation therein is reduced. However, the heat exchange in the secondary super heater, which is disposed in a down stream side of the secondary reheater, is performed fully to supplement the heat exchange loss. The lower the load, the smaller the temperature decrease in the down stream side becomes, thereby maintaining the temperature. In other words, when the temperatures in the outlets of the reheater and the super heater on full (100%) load operation are setted to any desired temperatures, the temperature change in the super heater becomes gradual on the load decrease, which is disposed in the down stream side of the reheater, which is disposed in the down stream side of the reheater, thereby being capable of fully maintaining the degree of super heating in the outlet of the high pressure turbine.

Figure 5:
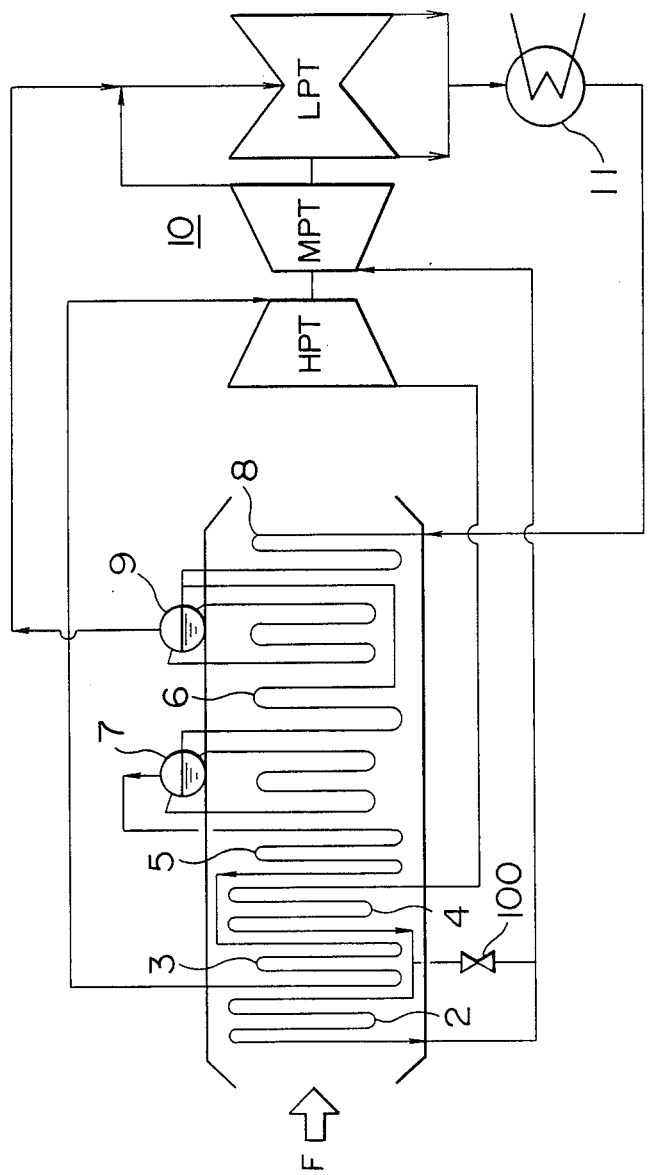
FIG. 5 is a schematic view of another embodiment of the present invention.

The other embodiment of the present invention shown in FIG. 5 additionally includes a bypass passage 100 for controlling the vapor temperature, which bypasses the secondary reheater 2 and connects the inlet of the secondary reheater 2 to the outlet thereof. Further, any other varieties of the recovery boiler can be readily obtained by providing the bypass passage similar to the bypass passage 100 to the super heater for controlling the vapor temperature therein, which is disposed between the separate reheaters.

According to the present invention, it can be possible to apply the reheat cycle to the plant combining the steam turbine system and the gas turbine means, whereby obtaining a safe operation of the plant having a high thermal efficiency over a wide range of the load.

First, the reheater is disposed in an upper most stream side in the waste heat recovery boiler, so that the vapor in the reheater can be reheated up to a temperature close to the temperature of the exhaust gas from the gas turbine. Therefore, it becomes possible to maintain the wetness fraction of the vapor in the final stage of the low pressure turbine within a proper range.

Secondly, the separate reheaters are so provided that the super heater is interposed between such reheaters, so that the primary vapor is maintained in a high temperature level even though the gas turbine operates in a partial load. Therefore, it is also possible to maintain the wetness fraction of the vapor in the outlet of the high pressure turbine within a proper range.

What is claimed is:

1. A waste heat recovery boiler comprising:
   separate high temperature heat exchanger means in which vapor is heat-exchanged with exhaust gas to produce high temperature vapor;

first passage means for supplying said high temperature vapor from said high temperature heat exchanger means to a first turbine means;

low temperature heat exchanger means in which feed water is heat-exchanged with said exhaust gas to produce low temperature vapor, a portion of said low temperature heat exchange means being disposed in a flow of exhaust gas between said separate high temperature heat exchanger means; and second passage means for supplying said low temperature vapor from said low temperature heat exchanger means to a second turbine means.

2. A waste heat recovery boiler according to claim 1, wherein one of said separate high temperature heat exchanger means is disposed in an upper most stream side of said exhaust gas flow.

3. A waste heat recovery boiler according to claim 1, wherein said boiler further comprises a third passage means for connecting an outlet of said second turbine means to an inlet of one of said separate high temperature heat exchanger means disposed on a down stream side of said exhaust gas flow, and a fourth passage means for connecting an outlet of said one of said separate high temperature heat exchanger means to an inlet of another one of said separate high temperature heat exchanger means disposed on an upper stream side of said exhaust gas flow.

4. A waste heat recovery boiler according to claim 2, wherein said boiler further comprises a third passage means for connecting an outlet of said second turbine means to an inlet of another one of said separate high temperature heat exchanger means disposed on a down stream side of said exhaust gas flow, and a fourth passage means for connecting an outlet of said another one of said separate high temperature heat exchanger means to an inlet of said one of said separate high temperature heat exchanger means disposed on an upper most stream side of said exhaust gas flow.

5. A reheat type waste heat recovery boiler comprising:
first heat exchanger means in which feed water is heat-exchanged with exhaust gas to produce low temperature vapor;
second reheat exchanger means in which said low temperature vapor is reheated with said exhaust gas to produce reheated high temperature vapor;
first passage means for supplying said low temperature vapor to high pressure turbine means; and
second passage means for supplying said reheated high temperature vapor to medium/low pressure turbine means.

6. A power generation plant comprising:
gas turbine means;
waste heat recovery boiler in which feed water is heat-exchanged with exhaust gas from said gas turbine means to produce low temperature vapor and high temperature vapor, said boiler including separate high temperature heat exchanger means for producing said high temperature vapor and low temperature heat exchanger means for producing said low temperature vapor, said low temperature heat exchanger means being interposed between said separate high temperature heat exchanger means;
steam turbine means to which said low temperature vapor and said high temperature vapor are supplied from said waste heat recovery boiler;
generator means driven by said steam turbine means; and
condenser means for condensing vapor from said steam turbine means into condensate and for supplying said condensate to said waste heat recovery boiler as said feed water.

7. A power generation plant according to claim 6, wherein one of said separate high temperature heat exchanger means is disposed in an upper most stream side of said exhaust gas flow.

8. A power generation plant according to claim 6, wherein said boiler further comprises a first passage means for connecting an outlet of said low temperature heat exchanger means to an inlet of a first turbine of said steamed turbine means, a third passage means for connecting an outlet of said first turbine of said steam turbine means to an inlet of one of said separate high temperature heat exchanger means disposed on a down stream side of said exhaust gas flow, a fourth passage means for connecting an outlet of said one of said separate high temperature high exchanger means to an inlet of another one of said separate high temperature high exchanger means disposed on an upper stream side of said exhaust gas flow, and a fifth passage means for connecting said outlet of said another one of said separate high temperature heat exchanger means to an inlet of a second turbine of said steam turbine means.

9. A power generation plant according to claim 7, wherein said boiler further comprises a first passage means for connecting an outlet of said low temperature heat exchanger means to an inlet of a first turbine of said steam turbine means, a third passage means for connecting an outlet of said first turbine of said steam turbine means to an inlet of another one of said separate high temperature heat exchanger means disposed on a down stream side of said exhaust gas flow, a fourth passage means for connecting an outlet of said another one of said separate high temperature heat exchanger means to an inlet of said one of said separate high temperature heat exchanger means disposed on an upper most stream side of said exhaust gas flow, and a fifth passage means for connecting an outlet of said one of said separate high temperature heat exchanger means to an inlet of a second turbine of said steam turbine means.

10. A reheat type power generation plant comprising:
gas turbine means;
waste heat recovery boiler in which feed water is heat-exchanged with exhaust gas from said gas turbine means to produce low temperature vapor, and said low temperature vapor is reheated with said exhaust gas to produce high temperature vapor;
steam turbine system including high pressure turbine and medium/low pressure turbine;
generator means driven by said steam turbine system;
first passage means for supplying said low temperature vapor to said high pressure turbine means; and
second passage means for supplying said reheated high temperature vapor to said medium/low pressure turbine means.

11. A power generation plant comprising:
gas turbine means;
waste heat recovery boiler in which feed water is heat-exchanged with exhaust gas from said gas turbine means to produce vapor, said waste heat recovery boiler including a secondary reheater, a super heater, a primary reheater for heating vapor to be supplied to said secondary reheater, and vapor generating means for heating said feed water to vapor and for supplying said vapor to said super heater in order with respect to the exhaust gas flow;

steam turbine system including high pressure turbine means and medium/low pressure turbine means to both of which said vapor is supplied from said waste heat recovery boiler;

generator means driven by said steam turbine system;

condenser means for condensing vapor from said steam turbine system into condensate and for supplying said condensate to said waste heat recovery boiler as said feed water;

first passage means for supplying vapor from said super heater to said high pressure turbine means; and second passage means for supplying vapor from said secondary reheater to said medium/low pressure turbine means.

12. A power generation plant comprising:

gas turbine means;

waste heat recovery boiler in which feed water is heat-exchanged with exhaust gas from said gas turbine means to produce vapor, said waste heat recovery boiler including a secondary reheater, a secondary super heater, a primary reheater heating vapor to be supplied to said secondary reheater, a primary super heater heating vapor to be supplied to said secondary super heater and vapor generating means for heating said feed water to vapor and for supplying said vapor to said primary super heater in order with respect to the exhaust gas flow;

steam turbine system including high pressure turbine means and medium/low pressure turbine means to both of which said vapor is supplied from said waste heat recovery boiler;

generator means driven by said steam turbine system;

condenser means for condensing vapor from said steam turbine system into condensate and for supplying said condensate to said waste heat recovery boiler as said feed water;

first passage means for supplying vapor from said secondary super heater to said high pressure turbine means; and second passage means for supplying vapor from said secondary reheater to said medium/low pressure turbine means.

13. A power generation plant according to claim 11, wherein bypass valve means is provided in passage means connecting said secondary reheater and said primary reheater for bypassing said secondary reheater.

14. A power generation plant according to claim 12, wherein bypass valve means is provided in passage means connecting said secondary reheater and said primary reheater for bypassing said second reheater.

* * * * *